United States Patent [19]

Tashiro et al.

[11] 4,384,032
[45] May 17, 1983

[54] FLUID TRANSMITTING POLYOLEFIN FOAMS AND METHOD OF MAKING THE SAME

[75] Inventors: Hisao Tashiro, Kawasaki; Hirokuni Naito, Hino; Masayuki Takayama, Yokohama; Isao Yoshimura, Fujisawa, all of Japan

[73] Assignee: Asahi-Dow Limited, Tokyo, Japan

[21] Appl. No.: 5,324

[22] Filed: Jan. 22, 1979

Related U.S. Application Data

[63] Continuation of Ser. No. 743,131, Nov. 19, 1976, abandoned, which is a continuation of Ser. No. 596,313, Jul. 16, 1975, abandoned, which is a continuation of Ser. No. 311,908, Dec. 4, 1972, abandoned, which is a continuation of Ser. No. 96,490, Dec. 9, 1970, abandoned.

[30] Foreign Application Priority Data

Dec. 11, 1969 [JP] Japan .............................. 44-099055

[51] Int. Cl.³ .......................... B32B 27/32; C08J 9/00
[52] U.S. Cl. .............................. 429/249; 264/DIG. 5; 521/87; 521/88; 521/95; 521/139; 521/140; 521/910; 521/134; 525/227; 525/229; 525/238; 525/240
[58] Field of Search .................. 521/134, 139, 140, 81; 429/249

[56] References Cited

U.S. PATENT DOCUMENTS

| 2,681,377 | 6/1954 | Smithers | 264/321 |
| 3,065,190 | 11/1962 | Chisholm et al. | 521/98 |
| 3,285,865 | 11/1966 | Del Bene et al. | 521/139 |
| 3,379,802 | 4/1968 | Raley et al. | 521/134 |
| 3,399,098 | 8/1968 | Omoto et al. | 264/321 |
| 3,474,049 | 10/1969 | Chappelear et al. | 521/134 |
| 3,474,051 | 10/1969 | Chappelear et al. | 521/134 |
| 3,558,753 | 1/1971 | Edlin | 264/54 |

*Primary Examiner*—Morton Foelak
*Attorney, Agent, or Firm*—Burgess, Ryan and Wayne

[57] ABSTRACT

A fluid transmitting polyolefin foam having a special open-cell cellular structure as compared with the conventional polyolefin foams having all cells closed is disclosed. Such a novel fluid transmitting polyolefin foam is produced by mixing a polyolefin with a polymer other than a polyolefin, said polyolefin and/or said polymer other than a polyolefin having a blowing agent incorporated therein and/or adhered thereto and subjecting the resulting mixture to extrusion moulding. The present fluid transmitting polyolefin foam has a wide variety of uses, for example, as a synthetic leather, synthetic filter cloth, separator of storage battery, synthetic paper, package, etc.

11 Claims, 8 Drawing Figures

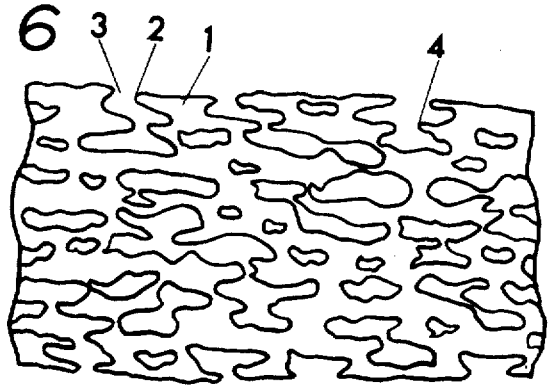
FIG. 6
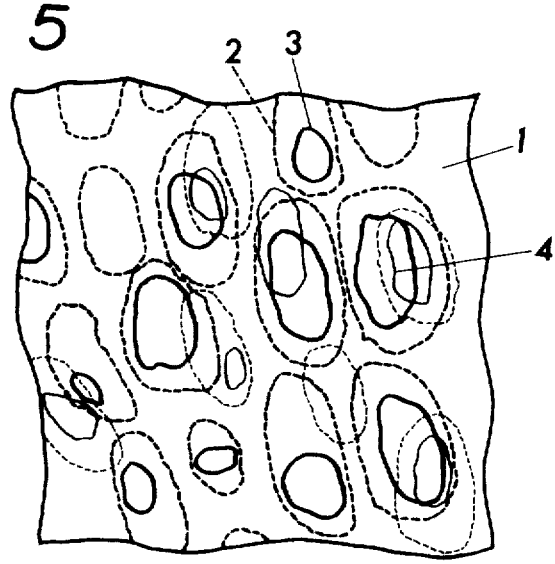
FIG. 5
FIG. 8
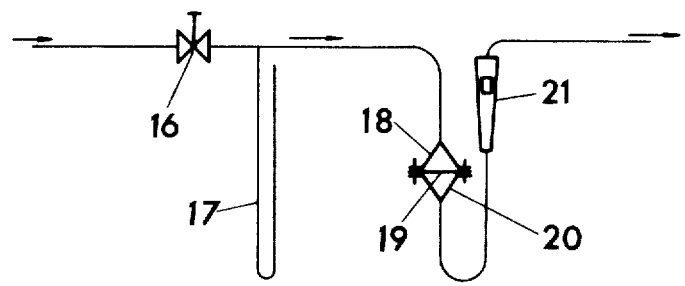

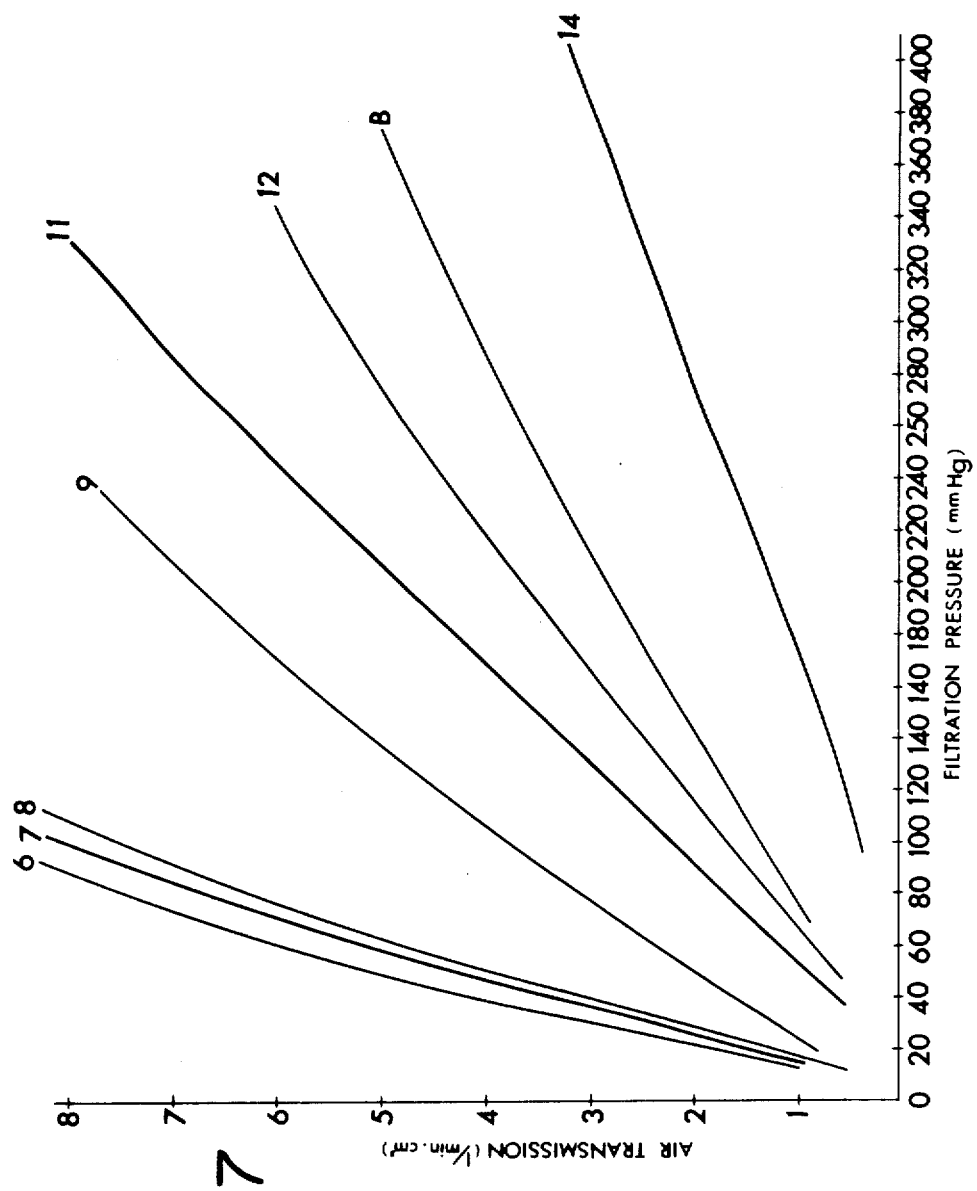

FLUID TRANSMITTING POLYOLEFIN FOAMS AND METHOD OF MAKING THE SAME

This is a continuation of application Ser. No. 743,131, filed Nov. 19, 1976, which is a continuation of U.S. Ser. No. 596,313, filed July 16, 1975, which is a continuation of U.S. Ser. No. 311,908 filed Dec. 4, 1972, which in turn is a continuation of U.S. Ser. No. 96,490 filed Dec. 9, 1970, all now abandoned. Priority is claimed under 35 USC 119 based on Japanese application No. 44-099055, a certified copy of which is of record in the file of the parent application.

This invention relates to a polyolefin foam, and more particularly to a fluid transmitting polyolefin foam and a method of making the same.

The polyolefin foams heretofore available are those having coarse closed cells. There have not yet been proposed any fluid transmitting polyolefin foams having uniform and fine, open cells.

The conventional polyolefin foams have some uses, for example, as a heat insulating material or a buffer material owing to strength, softness, elasticity and inertness which the polyolefins inherently have, because of their closed-cell cellular structure, however, the conventional polyolefin foams have limitations in their use. For example, they can not be used as a filter material, a diaphragm of an electrolytic cell or a separator in a storage battery, which have many applications in the chemical industries. In addition, they are not useful in the fields of package materials, synthetic leathers and papers which require a fluid transmitting property. Therefore, it would be highly desirable in many applications to provide a polyolefin foam having a fluid transmitting property which the conventional polyolefin foams do not have.

Conventionally, the polyolefin foams are made, for example, by the following method:

(1) Polyolefin is admixed with an organic chemical blowing agent and then heated to obtain a foamed moulding;

(2) Polyolefin is impregnated with an organic volatile blowing agent and then heated to obtain a foamed moulding; or (3) Polyolefin impregnated with an organic volatile blowing agent is admixed with an organic chemical blowing agent and then heated to obtain a foamed moulding.

The product made by such a conventional method has most of its cells closed. Thus, a conventional method can not give the over-all polyolefin foam product the uniform and fine, open-cell cellular structure; hence, the desired fluid transmitting property can not be obtained.

Even by such a conventional method, the polyolefin foam product having some fluid transmitting property is occasionally formed. For example, in making polyolefin foams by employing a volatile blowing agent, some of the closed cells are sometimes collapsed or joined together under some foaming conditions, such as by extrusion at a high temperature, to give a coarse cellular structure whereby there are partly formed apparent open cells and/or cracks as a poor quality product, thus imparting some fluid transmitting property to the finished product. However, the thus obtained polyolefin foams have open cells of uneven distribution and uneven and relatively large size, leading to poor appearance and strength of the product. Consequently, good quality polyolefin foams suitable for the aforementioned uses which require a fluid transmitting property could not be obtained by the conventional methods.

It is therefore one object of the present invention to provide a fluid transmitting polyolefin foam which is strong, elastic and soft.

It is another object of the present invention to provide a fluid transmitting polyolefin foam which is suitable for use as a filter material, a diaphragm material of an electrolytic cell, a separator material in a storage battery, a package material, a synthetic leather material or a synthetic paper material.

It is a further object of the present invention to provide a method of making a fluid transmitting polyolefin foam of the kind described.

The foregoing and other objects, features and advantages of the present invention will be apparent from the following detailed description taken in connection with the acccompanying drawings in which:

FIG. 5 is an illustrative copy of FIG. 3;

FIG. 6 is an illustrative copy of FIG. 4;

FIG. 7 is a diagram showing the relationships between air transmission and filtration pressure of filters made of polyolefin foams according to the present invention, shows in comparison with those of conventional filters; and FIG. 8 is a diagrammatic view of an apparatus used for making the diagram of FIG. 7.

The feature of a fluid transmitting polyolefin foam according to the present invention resides in that the polyolefin foam is formed of a composition of a polyolefin and a polymer other than a polyolefin mixed with and uniformly dispersed in each other and at the same time, the foam comprises cells having walls formed of said composition which are made of a uniformly dispersed mixture of the two components. The definite degree of the dispersion is not known. The cells are uniform as far as they can be seen with the naked eye and are still uniform even when examined under a microscope. All or most of the cells have openings in their walls which cooperate with one another to form passages from the openings in one surface of the foam through the openings in the other surface of the foam, thereby imparting a fluid transmitting property to the over-all foam.

Figure 1:
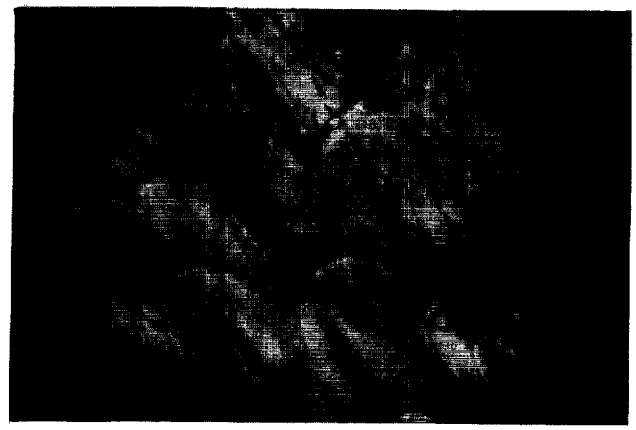
FIG. 1 is a photomicrographic plan view of a conventional polyethylene foam, shown with 100 magnifications.

Referring now to FIG. 1, the microphotographic picture shows the state of cells of a film of a conventional polyethylene foam. The film is produced by blending 100 parts of polyethylene which are impregnated with 7 parts of pentane with an auxiliary blowing agent consisting of 0.1 part of azobisbutyronitrile, 0.2 parts of citric acid and 0.4 parts of sodium bicarbonate and continuously moulding the resulting blend by means of an extruder with an inflation die which is similar to that employed in the Examples (which will be mentioned later). The product has all of the cells closed, and lacks a fluid transmitting property.

Figure 2:
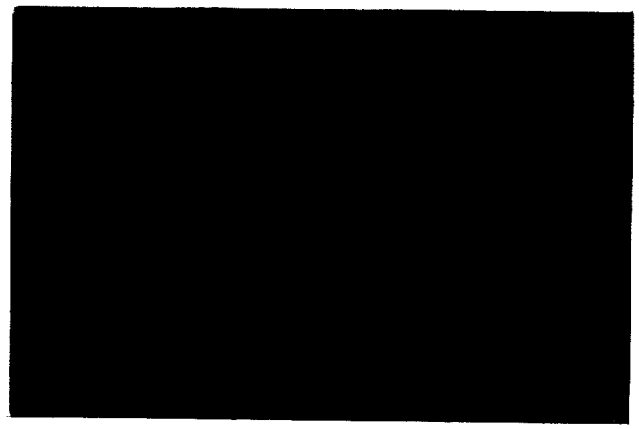
FIG. 2 is a photomicrographic plan view of a polyethylene foam according to the present invention, shown with 100 magnifications.

Referring to FIG. 2, even the microphotographic picture taken with 100 magnifications evidently shows that uniform and fine openings are formed (the foam employed is identical with the product of Example 1). In the picture, the opening can be seen in the white elliptic form.

Figure 3:
FIG. 3 is a photomicrographic plan view of the same foam with that of FIG. 2, but shown with 300 magnifications.

Referring to FIG. 3, there is the similar view to that of FIG. 2, but shown with 300 magnifications. A cell having an opening is seen on the outermost surface of the polyolefin foam. Under the opening in oblique relation thereto, there is seen another cell which holds said opening in common. By recurrence of such a combination as represented by opening→cell→opening, the opening of one surface of the foam is communicated with the opening of the other surface of the foam to form a passage through which a fluid can pass.

Figure 4:
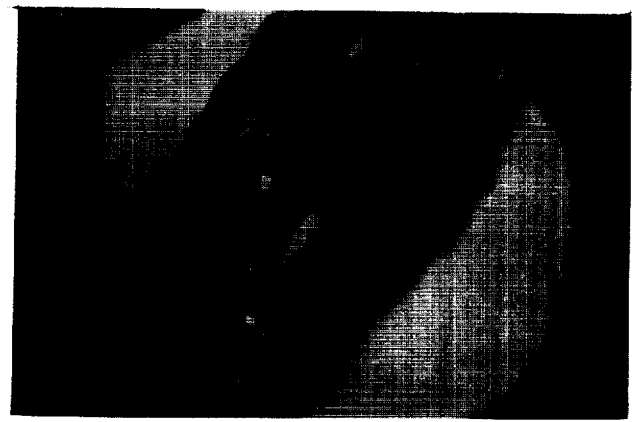
FIG. 4 is a photomicrographic sectional view taken along the line of thickness of the same foam with that of FIG. 2, shown with 250 magnifications.

In FIG. 4, the portion through which the light runs is an opening. This fact evidently shows that the communication along the line from front to rear in relation to the picture is also made. There is seen a cell which has an opening in common with another cell along the line of thickness also.

From FIGS. 2 to 4, it can be understood that there are formed various passages, such as a short passage, a complicated winding or a meandering passage, and a blind alley, between one surface and the other surface of the present polyolefin foam. This can also be understood from FIGS. 5 and 6 which are illustrative copies of the microphotographic pictures of FIG. 3 and FIG. 4, respectively.

Referring now to FIGS. 5 and 6, numeral 1 designates a surface skin and numeral 2 designates a periphery of the cell having an opening 3. The opening 3 is not always present in parallel with the surface but sometimes present in oblique or vertical relation to the surface. Numeral 4 designates an opening which is present inside.

When the polyolefin foam of the present invention is drawn only in one direction excessively, the openings of cells are caused to have an elongated form which is almost of a narrow gap whereby the plastic foam having such fibrous structure as if the overall structure is arranged in one direction is obtained.

The shape of the opening in the present polyolefin foam is not only varied depending on the drawing process but also dimensionally varied depending on the blowing agent and nucleating agent employed. The increased amount of a thermal decomposition type blowing agent causes the number of openings to be increased. The nucleating agent is useful for forming fine cells and openings. The increased amount of a polymer other than a polyolefin which is to be incorporated in the polyolefin causes the number of openings to be increased.

The expansion with foaming is preferably in the range of 1.2 to 5.0, more preferably in the range of 1.5 to 3.0 based on the volume of the original polymer mixture, since in case the expansion is less than 1.2, the cell size of the product becomes smaller but the fluid transmission becomes low while in case the expansion is more than 5, the fluid transmission becomes high but the cell size becomes larger.

Referring now to FIG. 7, there are shown the relationships between the air transmission and filtration pressure of the film made of the products of this invention in comparison with those of the conventional filters. The measurement was done by means of an apparatus as shown in FIG. 8. Referring to said FIG. 8, compressed air is introduced through a regulating valve 16 and, at the same time, the differential pressure (mmHg) between the atmospheric pressure and the pressure of compressed air is measured by a differential manometer 17 which is charged with mercury. The compressed air passes a specimen 19 held by hollow cones 18 and 20 between the flange portions thereof. Finally, the air volume is measured by means of a rotameter 21.

In FIG. 7, the ordinate shows the air transmission (liters/min·cm$^2$) which is obtained through dividing the air volume measured by the rotameter 21 in FIG. 8 by the filtration area (cm$^2$) of the specimen 19, while the abscissa shows the filtration pressure (mmHg) indicated by the manometer 17 in FIG. 8. The identifications of the curves in FIG. 7 are given in the following table.

| No. of curve | Specimen | Thickness, mm |
|---|---|---|
| 6 | Filter No. 1 (manufactured and sold by the Toyo Roshi Co., Ltd., Japan) | 0.210 |
| 7 | Filter No. 5A (manufactured and sold by the Toyo Roshi Co., Ltd., Japan) | 0.200 |
| 8 | Filter No. 2 (manufactured and sold by the Toyo Roshi Co., Ltd., Japan) | 0.260 |
| 9 | Filter of Example 3 | 0.290 |
| 11 | Filter No. 5B (manufactured and sold by the Toyo Roshi Co., Ltd., Japan) | 0.200 |
| 12 | Filter of Example 2 | 0.350 |
| 13 | Filter of Example 1 | 0.300 |
| 14 | Filter No. 5C (manufactured and sold by the Toyo Roshi Co., Ltd., Japan) | 0.200 |
| 15 | Specimen of FIG. 1 | 0.200 |

As is apparent from FIG. 7, the polyolefin foams of the present invention have fluid transmitting properties as high as those of the conventional filter papers. In addition, it is to be noted that according to this invention the present polyolefin foams can be easily produced.

Now, the method of making the polyolefin foams having the desired properties is described.

The present polyolefin foams are produced by (A) a method which comprises mixing a polyolefin with a polymer other than a polyolefin, said polyolefin and/or said polymer having a thermal decomposition type blowing agent incorporated therein and/or adhered thereto, and subjecting the resulting foaming polymer mixture to extrusion moulding; or (B) a method which comprises mixing a polyolefin with a polymer other than a polyolefin, said polyolefin and/or said polymer having a volatile blowing agent incorporated therein and further having a thermal decomposition type blowing agent incorporated therein and/or adhered thereto, and subjecting the resulting foaming polymer mixture to extrusion moulding.

The term "polyolefin" used herein is intended to include olefin homopolymers such as low density polyethylene, high density polyethylene, polypropylene and the like, and copolymers of an olefin and another component, such as ethylene-vinyl acetate copolymer, ethylene-propylene copolymer, ethylene-acrylic acid ester and the like. The copolymers may be employed in substitution for some or all of the olefin homopolymers. For example, the mixture of ethylene-vinyl acetate copolymer and other polyolefin can advantageously be employed to give the finished product having softness as well as strength.

Examples of the polymers other than a polyolefin include styrene-type polymers such as polystyrene, rubber-modified polystyrene, acrylonitrile-styrene copolymers and the like, and methacrylic acid-type polymers such as polymethyl methacrylate. The feature of these polymers is that they have poor compatibility with the polyolefin mentioned before. This feature is considered to have an influence on opening of the cells in the foam.

In mixing, the amount of polymer to be mixed with the polyolefin varies widely in the range of 1 to 99% by weight based on the total weight of the resulting mixture, but, in order to maintain the superior property inherent to polyolefin, the amount is preferably below 50% by weight, more preferably 1 to 30% by weight based on the weight of the mixture.

Examples of the thermal decomposition type blowing agents employed in this invention include azo-type compounds such as azodicarbonamide, barium azodicarboxylate, diazoaminobenzene and the like, sulfohydrazide-type compounds such as 4,4'-hydroxy-bis-benzenesulfonylhydrazide, p-toluenesulfonylhydrazide and the like, and nitroso-type compounds such as dinitrosopentamethylenetetramine and the like. The thermal decomposition type blowing agent to be employed is suitably selected from the above-mentioned compounds, depending upon the property of polyolefin used. The thermal decomposition type blowing agents may be employed, alone or in mixture, in an amount of 0.1 to 5.0 percent, preferably 0.3 to 3.0 percent by weight based on the weight of the total polymer. Examples of the auxiliary blowing agents employed together with the above-mentioned blowing agents include zinc stearate and calcium stearate. Examples of the nucleating agents include talc and silica. These auxiliary blowing agents and nucleating agents are useful for making the foaming uniform.

Examples of the volatile blowing agents include $C_2$-$C_6$ aliphatic hydrocarbons having an ordinary state of a gas or liquid, derivatives thereof and halogenated hydrocarbons. Said aliphatic hydrocarbons include ethane, ethylene, propane, propylene, butene, butane, pentane, hexane, petroleum ether and the like. Said derivatives include the ketones, alcohols and esters. Said halogenated hydrocarbons include methyl chloride, methylene chloride, trichlorofluoromethane, trichlorofluoroethane, dichlorofluoromethane, dichlorotetrafluoroethane and the like. Examples of the polymers in which the above-mentioned volatile types of blowing agents can be incorporated include styrene-type polymers such as polystyrene, rubber-modified polystyrene, acrylonitrile-styrene copolymer, acrylonitrile-butadiene-styrene copolymer and the like, methacrylic acid-type polymers such as polymethylene methacrylate and the like, ethylene-type polymers such as low density polyethylene, high density polyethylene, ethylene-vinyl acetate copolymers and the like, propylene-type polymers such as polypropylene and the like, and those suitably selected from mixtures of the above-mentioned polymers. These volatile blowing agents can be incorporated by a suitable method such as impregnation, extrusion or the like. The styrene-type polymers have superior property for incorporating therein the volatile blowing agents and are cheap. In addition, the volatile agents once incorporated in the styrene-type polymers can not easily volatilize out. For these reasons, the styrene-type polymers are advantageously used in this invention. The volatile blowing agent may be employed in an suitable amount; at most in an amount sufficient to saturate the polymer to be impregnated with the agent.

In carrying out the present invention, the aforementioned foaming polymer mixture is subjected to extrusion with foaming to give a uniform and fine, open-cell cellular plastic foam having a fluid transmitting property. For illustration, one embodiment of the present invention is given hereinbelow.

Polyolefin, for example, pellet or powder type polyethylene is blended with a given amount of a polymer, for example, polystyrene which incorporates therein a volatile blowing agent but is not yet foamed, a given amount of a thermal decomposition type blowing agent, for example, azodicarbonamide, and/or a given amount of a polymer which incorporates therein a thermal decomposition type blowing agent but is not yet foamed, and, if desired, an auxiliary blowing agent and a nucleating agent. The resulting blend is uniformly milled by means of a cone mill. As described before, this embodiment can be carried out without employing a volatile blowing agent. Subsequently, the resulting mixture is heated and plasticized in an extruder, and extruded employing one of various shapes of dies together with the extruder to readily obtain a desired shape of polyolefin foam of this invention, such as tube, sheet or pipe.

As described, a polyolefin foam of this invention has superior properties. Owing to such properties, the product has a wide variety of uses, such as synthetic leather, synthetic filter cloth, diaphragm of an electrolytic cell, separator in a storage battery, synthetic paper, etc. In addition, it is noted that, according to uses intended, various kinds of pigments and fillers may be incorporated therein.

The present invention is illustrated by the following examples, which should not be construed to limit the scope of the present invention.

In the examples, percent or parts are all given by weight unless specifically indicated.

EXAMPLE 1

100 Parts of high pressure process polyethylene (melt index: 0.3, density: 0.917) were uniformly blended with 7 parts of foaming polystyrene [STYRON 683 (trade name of polystyrene manufactured and sold by ASAHI DOW, Ltd.) in which pentane is, as an organic volatile blowing agent, incorporated in an amount of 6% based on the weight of foaming polystyrene.], 0.75 parts of a chemical blowing agent of CELLMIC (trade name of azobisformamide manufactured and sold by Sankyo Kasel Co., Ltd.), an auxiliary blowing agent consisting of 0.6 parts of zinc stearate and 1.0 parts of a nucleating agent of talc, by means of a blender at room temperature. The resulting blend was melted, milled and extruded by means of a 4 mm-diametered extruder provided with an annular die having a diameter of 75 mm and a slit of 0.6 mm at a temperature of 130° to 200° C., and then cooled between the die and a nip roll to obtain a foamed plastic film with a thickness of 0.30 mm and a width of 350 mm.

The thus obtained plastic foam film was uniformly foamed and had a cell size of 0.1 mm and a density of 0.48 g/cm$^3$. It was opaque and had a smooth and aventurine-like surface. The whiteness of the film was high. The film was pliant to the touch.

The film was easily sealed by means of an ordinary heat sealer. The bag obtained by heat-sealing the film was capable, through its overall area, of easily transmitting air or tobacco-smoke, and capable of transmitting water under a gauge pressure of about 0.23 kg/cm³ or more.

When an aqueous turbid solution of diatomaceous earth was subjected to filtration using the film obtained, the diatomaceous earth was nearly all filtered off without trouble to easily separate the diatomaceous earth from water.

The air transmissions of the film obtained in the instant example are illustrated in FIG. 7 in comparison with those of the conventional filters.

EXAMPLE 2

100 Parts of MIRASON ACE-30N (trade name of ethylene-vinyl acetate copolymer manufactured and sold by Mitsui Polychemical Co., Ltd.) were uniformly blended with 5 parts of foaming polystyrene (which is the same as the foaming polystyrene employed in Example 1), 0.70 parts of a chemical blowing agent of azobisformamide, 0.5 parts of zinc stearate, 1.50 parts of calcium stearate, and 0.5 parts of talc, using the same device and under the same condition as in Example 1 to obtain a foamed plastic film with a thickness of 0.35 mm and a width of 360 mm.

The thus obtained plastic foam film was uniformly foamed and had a cell size of 0.07 mm and a density of 0.53 g/cm³. It had a smooth and aventurine-like surface. The whiteness of the film was high. The film was pliant to the touch. It has further an excellent air transmitting property, and a filtering property for aqueous turbid solution, similarly to the film of Example 1.

The air transmissions of the film obtained in the instant example are illustrated in FIG. 7 in comparison with those of the conventional filters.

EXAMPLE 3

50 Parts of polyethylene (melt index: 0.2, density: 0.919) were blended with 50 parts of EVAFLEX 360 (trade name of ethylene-vinyl acetate copolymer manufactured and sold by Mitsui Polychemical Co., Ltd.), 30 parts of foaming polystyrene (in which pentane is incorporated in an amount of 2% based on the weight of foaming polystyrene), 0.70 parts of a chemical blowing agent of azobisformamide, 0.4 parts of zinc stearate, 1.0 parts of calcium stearate, and 2.0 parts of talc, according to the same method as in Example 1, to obtain a foamed plastic film with a thickness of 0.29 mm and a width of 350 mm.

The thus obtained plastic foam film was uniformly foamed and had a cell size of 0.05 mm or less and a density of 0.57 g/cm³. The whiteness of the film was extremely high. The film was pliant, though somewhat harder, to the touch like paper. It has further an excellent air transmission and a filtering property for an aqueous turbid solution as good as filter paper.

The air transmissions of the film obtained in the instant example are illustrated in FIG. 7 in comparison with those of the conventional filters.

EXAMPLE 4

80 Parts of polyethylene (melt index: 0.3, density: 0.919) and 20 parts EVAFLEX 360 (trade name of ethylene-vinyl acetate copolymer manufactured and sold by Mitsui Polychemical Co., Ltd.) were uniformly blended with 8 parts of foaming polystyrene (which is the same as employed in Example 1), a chemical blowing agent consisting of 0.70 parts of CELLMIC S (trade name of 4,4'-hydroxy-bisbenzenesulfonylhydrazide manufactured and sold by Sankyo Kasei Co., Ltd.), 0.5 parts of zinc stearate, 1.0 parts of calcium stearate and 0.5 parts of talc, in the same method as in Example 1 to obtain a foamed plastic film.

The thus obtained plastic foam film was uniformly foamed and had a cell size of 0.12 mm and a density of 0.61 g/cm³. The whiteness of the film was high. The film was soft and pliant to the touch. It has further an excellent air transmitting property and a good filtering property for an aqueous turbid solution, as well.

EXAMPLE 5

100 Parts of polyethylene (melt index: 0.5, density: 0.917 g/cm³) were uniformly blended with 5 parts of foaming polymethyl methacrylate [DELPET 70H (trade name of polymethyl methacrylate manufactured and sold by ASAHI KASEI KOGYO KABUSHIKI KAISHA) in which pentane is incorporated in an amount of 5% based on the weight of foaming polymethyl methacrylate], 0.75 parts of a chemical blowing agent of azobisformamide, 0.5 parts of zinc stearate, 1.0 part of calcium stearate and 0.5 parts of talc, by means of a blender at normal temperature. The resulting blend was treated in the same manner as in Example 1 to obtain a foamed plastic film.

The thus obtained plastic foam film was uniformly foamed and had a cell size of 0.15 mm and a density of 0.68 g/cm³. It had cells forming winding or meandering passages. The whiteness of the film was high and the film had gas transmitting property.

EXAMPLE 6

80 Parts of polyethylene (melt index: 0.3, density: 0.917) were uniformly blended with 20 parts of EVAFLEX 360 (trade name of ethylene-vinyl acetate copolymer manufactured and sold by Mitsui Polychemical Co., Ltd.), 6 parts of STYRON 666 (trade name of polystyrene manufactured and sold by ASAHI DOW, Ltd.), 0.7 parts of azobisformamide, 0.50 parts of the zinc stearate, 1.5 parts of calcium stearate and 0.5 parts of talc, by means of a blender at normal temperature. The resulting blend was treated in the same manner as in Example 1 to obtain a foamed plastic film.

The thus obtained plastic film had a cell size of 0.1 mm or less and a density of 0.5 g/cm³. The whiteness of the film was high and the touch of it is pliant. The film of the instant example is also excellent in its air transmitting property and higher than that of Example 3 in its filtration rate, though some turbidity was observed after filtration.

COMPARATIVE EXAMPLE 1

100 Parts of polyethylene of low density (density: 0.917, melt index 0.3) were blended with 0.75 parts of a decomposition type blowing agent of azobisformamide, 0.5 parts of an auxiliary blowing agent of calcium stearate, and 0.5 parts of a nucleating agent of talc and treated in the same method as described in Example 1.

The thus obtained film had a cell size of 0.10 mm and a density of 0.59 g/cm³. It had a smooth and lustrous surface, uniform foam distribution and cell size, showing a good appearance. However, there was no noticeable air transmission and no open cells were observed in a wall of cells.

COMPARATIVE EXAMPLE 2

100 Parts of foaming polyethylene (the polyethylene of Comparative Example 1 in which pentane is incorporated in an amount of approximately 7% based on the weight of polyethylene) were blended with 0.5 parts of zinc stearate and 1.0 parts of talc and treated in the same method as in Example 1.

The thus obtained film was not uniformly foamed and had a cell size of 0.8–2.0 mm and a density of 0.67 g/cm³. The film was opaque and not good in its appearance due to its uneven surface. With the film, no air transmission was perceived. No opening of a wall of cells in the film was observed.

COMPARATIVE EXAMPLE 3

100 Parts of foaming polyethylene which is the same as mentioned in Comparative Example 2 were blended with 0.30 parts of a decomposition type foaming agent of azobisformamide, 0.5 parts of zinc stearate, and 0.50 parts of talc and treated in the same method as mentioned in Example 1.

The thus obtained film had a cell size of 0.2–0.4 mm and a density of 0.48 g/cm³. It had a lustrous but uneven surface and was not uniform in cell size. With the film, no air transmission was perceived. No opening of a wall of cells in the film was observed.

As apparent from the foregoing description, the foamed material obtained according to the present invention has an excellent fluid transmitting property, an even surface, a pliant touch, and such advantageous properties as a easy processability by heat-sealing for a material of large length and width and stability and is, therefore, widely applicable to agriculture and industry as well as the fields of clothing packaging, synthetic paper, etc.

Further, photogravure printings of a printed letter, photograph or pattern were performed on the plastic foam of the present invention and the plastic foam of Comparative Example 3 using an oil soluble ink, and a removing test was conducted by means of an adhering tape. As a result, it was found that the print on the plastic foam of Comparative Example 3 is easily removed by the test to return the plastic foam to its original unprinted state, in which no marks of ink were observed in the cells. By contrast, the plastic foam of the present invention was retained in the printed state even after ordinary washing.

What is claimed is:

1. A fluid transmitting polyolefin foam having a density of less than 0.5 g/cm² formed of a polyolefin selected from the group consisting of ethylene and propylene polymers and from 1% to 99% by weight of a styrene or methacrylic acid ester polymer, said foam having cells formed therein and all or partly having their walls with an opening of less than 0.1 mm. which cooperates with one another to form passages from the openings in one surface of the foam to the other surface thereby imparting a fluid transmitting property to the overall foam.

2. A fluid transmitting polyolefin foam as claimed in claim 1 wherein said polyolefin is a member selected from the group consisting of a low density polyethylene, a high density polyethylene, an ethylene-vinyl acetate copolymer, an ethylene-butene copolymer, a polypropylene and a propylene-ethylene copolymer and mixtures thereof.

3. A fluid transmitting polyolefin foam as claimed in claim 1, wherein said styrene or methacrylic acid ester polymer is selected from the group consisting of polystyrene, polymethyl methacrylate, acrylonitrile-butadiene-styrene copolymer and mixtures thereof.

4. A method of making a fluid transmitting polyolefin foam according to claim 1 which comprises mixing a polyolefin selected from the group consisting of ethylene and propylene polymers with 1 to 30% based on the total weight of the mixture, of a styrene or methacrylic acid ester polymer wherein each or both of said polyolefin and said styrene or methacrylic acid polymer have a thermal decomposition type blowing agent selected from the group consisting of azo-type blowing agents, and mixtures thereof, and a volatile type blowing agent selected from the groups consisting of aliphatic hydrocarbons having 2 to 6 carbon atoms which may be unsubstituted or substituted with halogens; and ketones, alcohols and esters derived from said aliphatic hydrocarbons, incorporated therein or adhering thereto, said blowing agent being present in an amount varying between 0.1 and 5% by weight, based on the total weight of the polymer mixture, and subjecting the resulting foaming polymer mixture to extrusion moulding to obtain an expansion by foaming of 1.2 to 5.0.

5. A synthetic leather which comprises an open-celled foam comprising a polyolefin selected from the group consisting of ethylene and propylene polymers and a styrene or methacrylic acid ester polymer said openings between said walls being less than 0.1 mm., said foam having a density of less than 0.5 g/cm³, said walls cooperating with one another to form passages from the openings in the other surface of the foam, thereby imparting a fluid transmitting property to the overall leather.

6. A synthetic filter cloth which comprises an open-cell foam comprising a polyolefin selected from the group consisting of ethylene and propylene polymers and a styrene or methacrylic acid ester polymer, said openings between said walls being less than 0.1 mm, said foam having a density less than 0.5 g/cm³ and said walls cooperating with one another to form passages from the openings in one surface of the foam through the openings in the other surface of the foam, thereby imparting a fluid transmitting property to the overall filter.

7. A separator for a storage battery which comprises an open-celled foam comprising a polyolefin selected from the group consisting of ethylene and propylene polymers and a styrene or methacrylic acid ester polymer, said openings between said walls being less than 0.1 mm., said foam having a density less than 0.5 g/cm³, and said walls cooperating with one another to form passages from the openings in one surface of the foam through the openings in the other surface of the foam, thereby imparting a fluid transmitting property to the over-all separator.

8. A synthetic paper which comprises an open-celled foam comprising a polyolefin selected from the group consisting of ethylene and propylene polymers and a styrene or methacrylic acid ester polymer, said openings between said walls being less than 0.1 mm., said foam having a density less than 0.5 g/cm³, and said walls cooperating with one another to form passages from the openings in one surface of the foam through the openings in the other surface of the foam, thereby imparting a fluid transmitting property to the over-all paper.

9. A fluid transmitting polyolefin foam as claimed in claim 1 wherein the polyolefin is a polyethylene and the polymer is polystyrene, said polystyrene being present in an amount varying between 1 and 30% by weight.

10. A fluid transmitting polyolefin foam as claimed in claim 1 wherein the polymer is an ethylene-vinyl acetate copolymer.

11. A fluid transmitting polyolefin foam as claimed in claim 1 wherein the polymer is a polymethyl methacrylate.

* * * * *